(12) United States Patent
Li et al.

(10) Patent No.: US 8,005,023 B2
(45) Date of Patent: Aug. 23, 2011

(54) CLIENT-SIDE ECHO CANCELLATION FOR MULTI-PARTY AUDIO CONFERENCING

(75) Inventors: Junlin Li, Atlanta, GA (US); Li-wei He, Redmond, WA (US); Dinei Florencio, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1104 days.

(21) Appl. No.: 11/763,224

(22) Filed: Jun. 14, 2007

(65) Prior Publication Data
US 2008/0310328 A1 Dec. 18, 2008

(51) Int. Cl.
*H04L 12/16* (2006.01)
*H04B 3/20* (2006.01)

(52) U.S. Cl. ..................... 370/260; 370/286
(58) Field of Classification Search ......... 370/260–271, 370/286–290
See application file for complete search history.

(56) References Cited

U.S. PATENT DOCUMENTS

| | | | | |
|---|---|---|---|---|
| 4,707,824 A * | 11/1987 | Kanemasa | ................. | 370/290 |
| 4,969,144 A * | 11/1990 | Blackwell et al. | ............ | 370/290 |
| 5,305,307 A * | 4/1994 | Chu | ................. | 370/288 |
| 5,434,912 A | 7/1995 | Boyer et al. | | |
| 5,796,819 A | 8/1998 | Romesburg | | |
| 6,327,276 B1 | 12/2001 | Robert et al. | | |
| 6,816,592 B1 * | 11/2004 | Kirla | ................. | 379/406.05 |
| 6,931,123 B1 | 8/2005 | Hughes | | |
| 6,947,773 B2 | 9/2005 | Novorita | | |
| 6,987,992 B2 | 1/2006 | Hundal | | |
| 2002/0123895 A1 | 9/2002 | Potekhin | | |
| 2003/0123399 A1 * | 7/2003 | Zhang et al. | ................. | 370/286 |
| 2005/0094580 A1 | 5/2005 | Kumar | | |
| 2006/0247045 A1 | 11/2006 | Jeong | | |

FOREIGN PATENT DOCUMENTS
EP   1715669 A1   10/2006
WO   WO2006111370 A1   10/2006

OTHER PUBLICATIONS

Gentile, K., W. Daniel, L. Worthington, J. Blatnik, Audio conferencing quality of service issues within the transition from circuit-switched to packet-switched, Jul. 2008.

(Continued)

*Primary Examiner* — Hong Cho
(74) *Attorney, Agent, or Firm* — Lyon & Harr, LLP; Mark A. Watson (57) ABSTRACT

A "Client-Side Echo Canceller" provides a unique system and method for reducing Multipoint Control Unit (MCU) computational overhead in a multi-point audio conference. In general, the local audio input signal of each client is transmitted in real-time to the MCU. The MCU then combines the audio input signals of all clients to create a single composite signal that is transmitted back to all clients in real-time. Each client then locally processes the composite signal to remove each client's local contribution to the composite signal prior to local playback in order to eliminate a local echo of each client's local audio input. In various embodiments, local cancellation of the local audio input from the composite signal is performed on either a time domain or a transform domain representation of the composite signal. Further, since each client receives the same signal, MCU transmission bandwidth can be reduced via multicast transmissions.

20 Claims, 5 Drawing Sheets

OTHER PUBLICATIONS

Gong, F., Multipoint Multipoint audio and video control for packet-based multimedia conferencing, Proc. of the 2nd ACM Int'l Conf. on Multimedia, 1994, San Francisco, California, United States, pp. 425-432.

Hirasawa, J., T. Amakasu, S. Yamamoto, Y. Yamaguchi, and A. Imamura, Cyber attendant system with spontaneous speech interface, Speech and Audio Signal Processing Technologies, NTT Technical Review, Special Feature, Mar. 2004, pp. 64-69, vol. 2, No. 3.

Hiwasaki, Y., T. Mori, H. Ohmuro, J. Ikedo, D. Tokumoto, and A. Kataoka, Scalable speech coding technology for high-quality ubiquitous communications, Speech and Audio Signal Processing Technologies, NTT Technical Review, Special Feature, Mar. 2004, pp. 53-58, vol. 2, No. 3.

ITU-T Rec. G.722.1, "Coding at 24 and 32 kbit/s for hands-free operation in systems with low frame loss," Sep. 1999.

ITU-T Rec. H.323, "Packet-based multimedia communication systems," Nov. 2000.

ITU-T Rec. P.800, "Methods for subjective determination of transmission quality," Aug. 1996.

Mizuno, H., H. Asano, M. Isogai, M. Hasebe, and M. Abe, Text-to-speech sythesis technology using corpus-based approach, Speech and Audio Signal Processing Technologies, NTT Technical Review, Special Feature, Mar. 2004, pp. 70-75, vol. 2, No. 3.

Sakauchi, S., Y. Haneda, M. Okamoto, J. Sasaki, and A. Kataoka, Echo canceller with noise reduction provides comfortable hands' free telecommunication in noisy environments, Speech and Audio Signal Processing Technologies, NTT Technical Review, Special Feature, Mar. 2004, pp. 59-63, vol. 2, No. 3.

Smith, P. J., P. Kabal, M.L. Blostein, and R. Rabipour, Tandem free voip conferencing: A bridge to next-generation networks, IEEE Communication Magnize, May 2003, vol. 41, No. 5, pp. 136-145.

Smith, P. J., P. Kabal, and R. Rabipour, Speaker selection for tandem-free operation voip conference bridges, in Proc. IEEE Workshop Speech Coding, Oct. 2002, pp. 120-122.

Takahashi, S., M. Okamoto, and H. Ohara, Speech and audio signal processing for a user-friendly comfortable, convenient telecommunication environment, Speech and Audio Signal Processing Technologies, NTT Technical Review, Special Feature, Mar. 2004, pp. 50-52, vol. 2, No. 3.

Xu, X., L. He, D. Florencio, and Y. Rui, Pass: Peer-aware silence suppression for internet voice conferences, IEEE Int'l Conf. on Multimedia & Expo, 2006.

* cited by examiner

CLIENT-SIDE ECHO CANCELLATION FOR MULTI-PARTY AUDIO CONFERENCING

BACKGROUND

1. Technical Field

The invention is related to echo cancellation, and in particular, to client-side echo cancellation wherein each client receives a common encoded signal representing a sum of signals from multiple clients, and wherein each client locally cancels its own local signal from the common encoded signal prior to local playback.

2. Related Art

Voice communication over networks such as the Internet is rapidly evolving into a global communications network. For one-to-one communication between two clients, there are many simple ways to enable two-way voice communications. However, as soon as more than two clients enter into a multi-party conference call, voice communications become more complicated.

The simplest multiparty audio conference architecture is generally referred to as "full-mesh," where all clients directly communicate to each other. One major advantage of this architecture is its high audio quality because the audio packets are encoded once and require only one hop from the sender to the receiver. Further, since the packets travel directly between the sender and the receiver, the service provider incurs no additional cost after the connections have been established. However in full-mesh, the bandwidth consumption and computation load on each client increase proportionally to the size of the conference.

Alternatively, centralized architectures are often implemented using a star-shaped topology where all the clients connect to a central MCU (Multipoint Control Unit), which is responsible for mixing the audio signals received from each local client, then sending an encoded signal sum back to all the clients for local decoding and playback. However, in order to prevent local speakers from hearing their own voices or other local audio signals (as a delayed "echo"), traditional MCUs operate by producing and encoding a different mixed signal for each local client. Specifically, the encoded signal sent to each individual client contains only the signals from all of the other clients. While this technique works well for a relatively few number of clients, the CPU load and transmission bandwidth requirements of the MCU increase in direct proportion to the number of clients in the conference. Consequently, the performance of such systems can begin to degrade as the number of clients increase.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A "Client-Side Echo Canceller," as described herein, provides a unique method for locally eliminating local audio signals from a composite audio signal formed from audio input signals received from a plurality of clients connected in a multipoint audio conference.

In particular, the Client-Side Echo Canceller uses a single Multipoint Control Unit (MCU) to combine audio input signals received from each client connected in the multipoint audio conference to produce a single composite signal. Unlike conventional centralized audio conference systems, which send a unique signal to every client, the MCU of the Client-Side Echo Canceller transmits the same composite signal to all of the individual clients. However, since the composite signal includes each client's own contribution to the composite signal, local playback of the composite signal without further processing will result in a local delayed "echo" of each client's own audio input signal.

Therefore, to avoid this local echo, each client acts to locally cancel its own audio input signal from the composite signal prior to local playback. However, due to the effects of random non-linear quantization-based distortions introduced into the composite signal during encoding and construction of that composite signal, local cancellation of each client's contribution to the composite signal is not as simple as directly subtracting the local signal from the composite signal.

However, each client has access to both the original audio signal it sends to the MCU, and to the composite signal received from the MCU. Consequently, in one embodiment, each client acts individually to generate an estimate of quantization effects in the composite signal relative to that client's local audio input. The resulting estimate of quantization effects is then combined with the local audio input. The resulting processed version of the local audio input is then subtracted from the composite signal prior to local playback. In another embodiment, each local client uses its local audio input in combination with the composite signal received from the MCU to directly estimate a version of the composite signal without the contribution of the local audio input. In other words, this estimated version of the composite signal represents a version of the composite signal that does not include a contribution from the local audio input.

Further, although each of the aforementioned embodiments removes essentially all echo (delayed local audio input) from the local playback of the composite signal, perceptible artifacts can be introduced into the locally processed version of the composite signal. Therefore, in related embodiments, the Client-Side Echo Canceller provides further processing of the resulting composite signal prior to local playback to further attenuate or otherwise mask any artifacts resulting from cancellation of the local audio signal from the composite signal.

In view of the above summary, it is clear that the Client-Side Echo Canceller described herein provides a unique system and method for reducing MCU computational overhead in a multipoint audio conference by providing a common composite audio signal to local clients, and then locally processing the composite signal to remove each clients local contribution to the composite signal prior to local playback. In addition to the just described benefits, other advantages of the Client-Side Echo Canceller will become apparent from the detailed description that follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
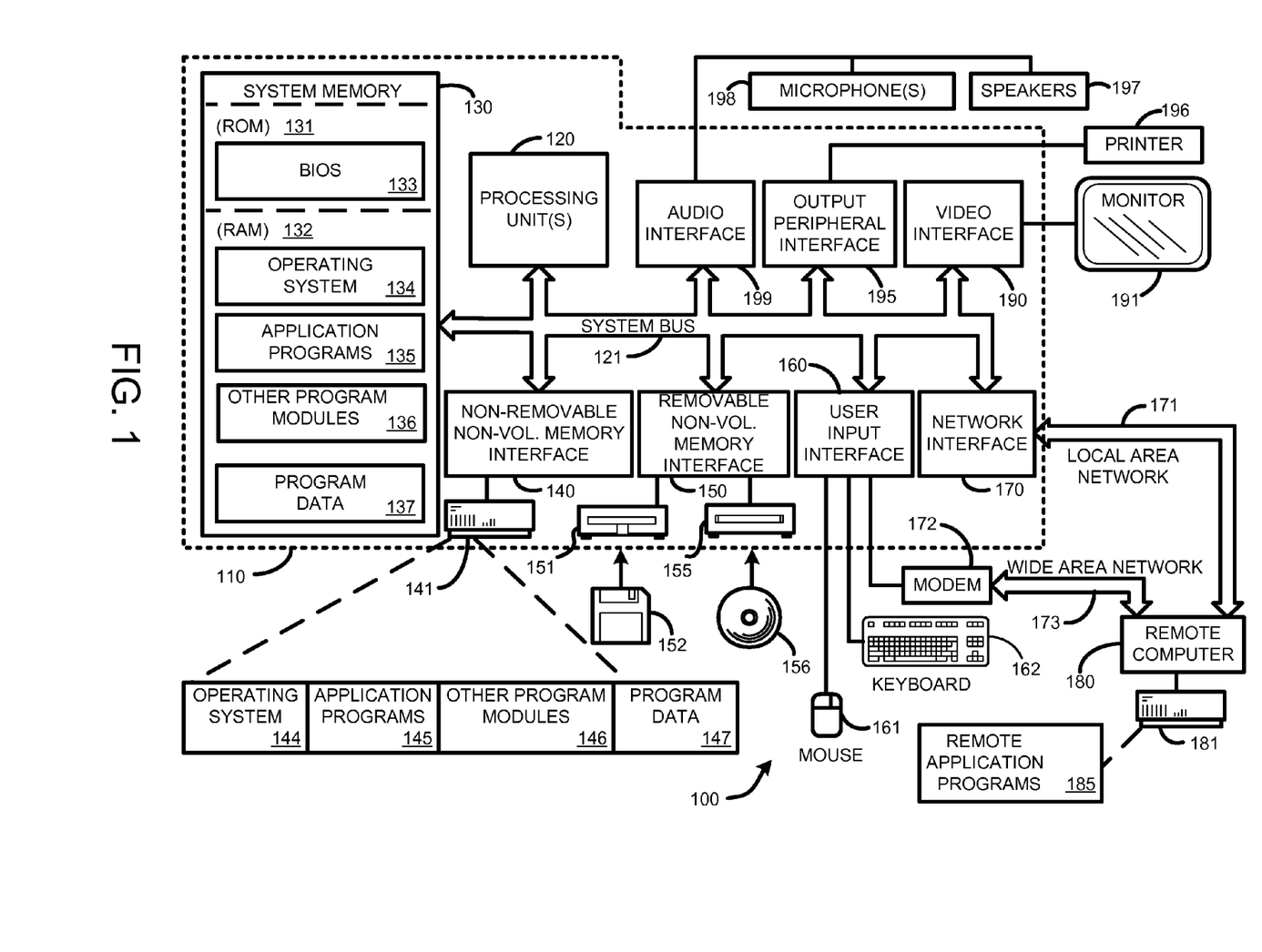
FIG. 1 is a general system diagram depicting a general-purpose computing device constituting an exemplary system for use in implementing a "Client-Side Echo Canceller," as described herein.
Figure 2:
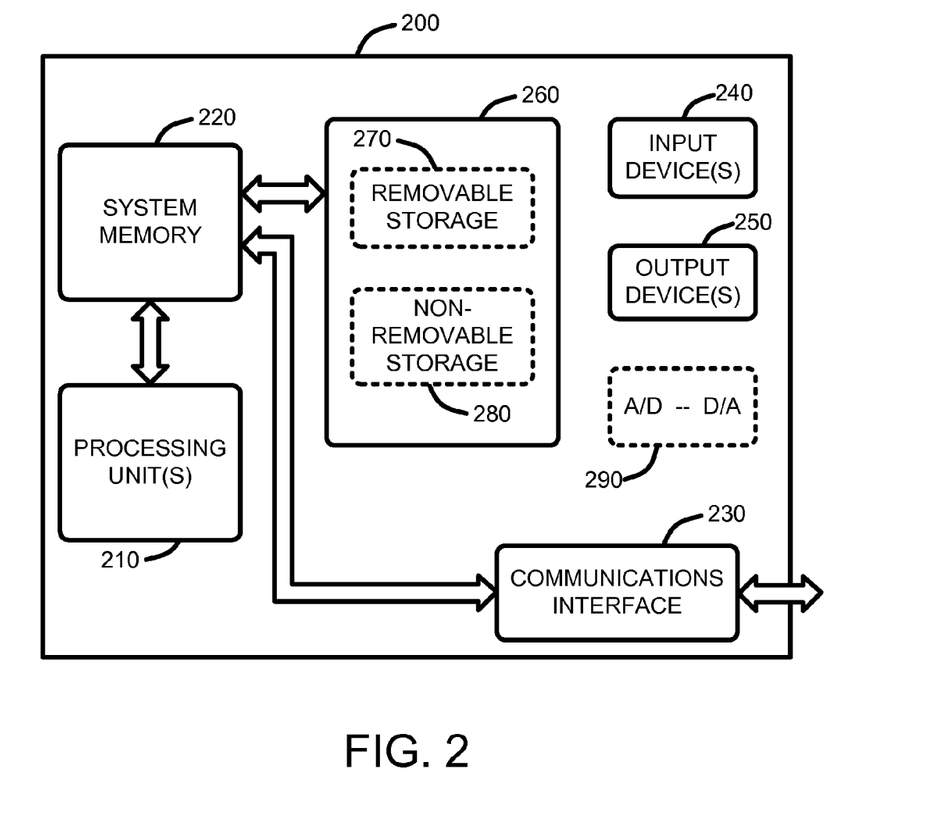
FIG. 2 is a general system diagram depicting a general device having simplified computing and I/O capabilities for use in implementing a "Client-Side Echo Canceller," as described herein.

1.0 Exemplary Operating Environments:

FIG. 1 and FIG. 2 illustrate two examples of suitable computing environments on which various embodiments and elements of a "Client-Side Echo Canceller," as described herein, may be implemented.

For example, FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer in combination with various hardware modules. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules, or other data.

Computer storage media includes, but is not limited to, RAM, ROM, PROM, EPROM, EEPROM, flash memory, or other memory technology; CD-ROM, digital versatile disks (DVD), or other optical disk storage; magnetic cassettes, magnetic tape, magnetic disk storage, or other magnetic storage devices; or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/ nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad.

Other input devices (not shown) may include a joystick, game pad, satellite dish, scanner, radio receiver, and a television or broadcast video receiver, or the like. These and other input devices are often connected to the processing unit 120 through a wired or wireless user input interface 160 that is coupled to the system bus 121, but may be connected by other conventional interface and bus structures, such as, for example, a parallel port, a game port, a universal serial bus (USB), an IEEE 1394 interface, a Bluetooth™ wireless interface, an IEEE 802.11 wireless interface, etc. Further, the computer 110 may also include a speech or audio input device, such as a microphone or a microphone array 198, as well as a loudspeaker 197 or other sound output device connected via an audio interface 199, again including conventional wired or wireless interfaces, such as, for example, parallel, serial, USB, IEEE 1394, Bluetooth™, etc.

A monitor 191 or other type of display device is also connected to the system bus 121 via an interface, such as a video interface 190. In addition to the monitor, computers may also include other peripheral output devices such as a printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

With respect to FIG. 2, this figure shows a general system diagram showing a simplified computing device. Such computing devices can be typically be found in devices having at least some minimum computational capability in combination with a communications interface for receiving input signals, including, for example, cell phones, PDA's, dedicated media players (audio and/or video), etc. It should be noted that any boxes that are represented by broken or dashed lines in FIG. 2 represent alternate embodiments of the simplified computing device, and that any or all of these alternate embodiments, as described below, may be used in combination with other alternate embodiments that are described throughout this document.

At a minimum, to allow a device to implement the functionality of the Client-Side Echo Canceller, the device must have some minimum computational capability, some storage capability, an interface for allowing local audio signal input (such as, for example, a signal produced by a microphone or a microphone array), and an output device (such as a speaker) for providing local audio signal playback.

In particular, as illustrated by FIG. 2, the computational capability is generally illustrated by processing unit(s) 210 (roughly analogous to processing units 120 described above with respect to FIG. 1). Note that in contrast to the processing unit(s) 120 of the general computing device of FIG. 1, the processing unit(s) 210 illustrated in FIG. 2 may be specialized (and inexpensive) microprocessors, such as a DSP, a VLIW, or other micro-controller rather than the general-purpose processor unit of a PC-type computer or the like, as described above.

In addition, the simplified computing device of FIG. 2 may also include other components, such as, for example one or more input devices 240 (analogous to the input devices described with respect to FIG. 1). The simplified computing device of FIG. 2 may also include other optional components, such as, for example one or more output devices 250 (analogous to the output devices described with respect to FIG. 1). The simplified computing device of FIG. 2 also includes storage 260 that is either removable 270 and/or non-removable 280 (analogous to the storage devices described above with respect to FIG. 1). Finally, the simplified computing device of FIG. 2 may also include an analog-to-digital and/or digital-to-analog converter 290 for converting audio or other signals to and from analog to digital, as necessary.

The exemplary operating environment having now been discussed, the remaining part of this description will be devoted to a discussion of the program modules and processes embodying a "Client-Side Echo Canceller" which provides client-side echo cancellation by locally cancelling each clients audio signal contribution to a common composite audio signal created from the audio signal contributions of all clients connected in a multipoint audio conference prior to local playback of the composite audio signal.

2.0 Introduction:

A "Client-Side Echo Canceller," as described herein, provides a unique system and method for reducing Multipoint Control Unit (MCU) computational overhead in a multipoint audio conference. In general, the Client-Side Echo Canceller operates by using a remote MCU to construct a common composite audio signal from individual audio inputs received from all local clients connected in the multipoint audio conference. The MCU then transmits the composite signal to each individual client. Each client then locally processes the composite signal to remove each client's local contribution to the composite signal prior to local playback. Note that the Client-Side Echo Canceller can be implemented using any desired codec, such as, for example, the well known ITU-T G.722.1 codec (i.e., "Siren"), ITU-T G.711, etc. Further, since each client receives the same composite signal, MCU transmission bandwidth requirements can be reduced by using conventional multicast transmission techniques to send the common signal to the clients.

2.1 System Overview:

As noted above, the Client-Side Echo Canceller described herein provides a unique method for locally eliminating local audio signals from a composite audio signal formed from audio input signals received from a plurality of clients connected in a multipoint audio conference.

In particular, the Client-Side Echo Canceller uses a single MCU to combine audio input signals received from each client connected in the multipoint audio conference to produce a single composite signal. Unlike conventional full-mesh type audio conferencing systems which send a unique signal to every client, the MCU of the Client-Side Echo Canceller transmits the same composite signal to all of the individual clients. However, since the composite signal includes each client's own contribution to the composite signal, local playback of the composite signal without further processing will result in a local delayed "echo" of each client's audio input signal.

Therefore, to avoid this local echo, each client acts to locally cancel its own audio input signal from the composite signal prior to local playback. However, local cancellation of each client's contribution to the composite signal is not as simple as directly subtracting the local signal from the composite signal. Specifically, each client first encodes its local audio signal and transmits it to the MCU. The MCU then decodes the audio signal of each client, combines all of the decoded signals, then re-encodes the resulting composite signal for transmission back to each client.

Unfortunately, non-linear quantization-based distortions are typically introduced into the composite signal by the MCU encoder. This distortion, i.e., quantization noise, is random, but its energy is roughly proportional to the encoded signal. For that reason, when the original (i.e., undistorted) signal is subtracted, the residual signal sounds like a distorted echo. Since quantization error is random, it is generally considered impossible to accurately predict. However, since each client has access to both the original audio signal it sends to the MCU, and to the composite quantized signal, the Client-Side Echo Canceller operates to generate an estimate of the quantization effects and noise for use in cancelling the local audio input from the composite signal, or for estimating a "clean" version of the composite signal prior to local playback of the composite signal.

For example, in one embodiment, quantization noise is locally estimated by each client by passing the clients local audio input signal through two encoding and decoding cycles to simulate the entire encoding and decoding chain from each local client, to the MCU, and back again. Since quantization parameters (e.g., quantization step) are input dependent, the second local encoding step uses the same quantization parameters used by the encoder in the MCU. It should be noted that these quantization parameters can be obtained directly from the bitstream of the composite signal without extra cost (i.e., no additional side information is needed).

The difference between the twice encoded and decoded local audio signal and the original local audio signal then provides an estimate of the quantization noise introduced by the MCU. Consequently, rather than cancelling the local audio signal by subtracting the original local signal from the composite signal, the twice encoded and decoded audio signal is used, i.e., locally subtracted from the composite audio signal.

Further, while this local signal cancellation removes essentially all echo from the local playback of the resulting processed composite signal, perceptible artifacts can be introduced into that processed composite signal. Therefore, in related embodiments, the Client-Side Echo Canceller provides further processing of the resulting composite signal prior to local playback to further attenuate or otherwise mask any artifacts resulting from cancellation of the local audio signal from the composite signal.

Figure 3:
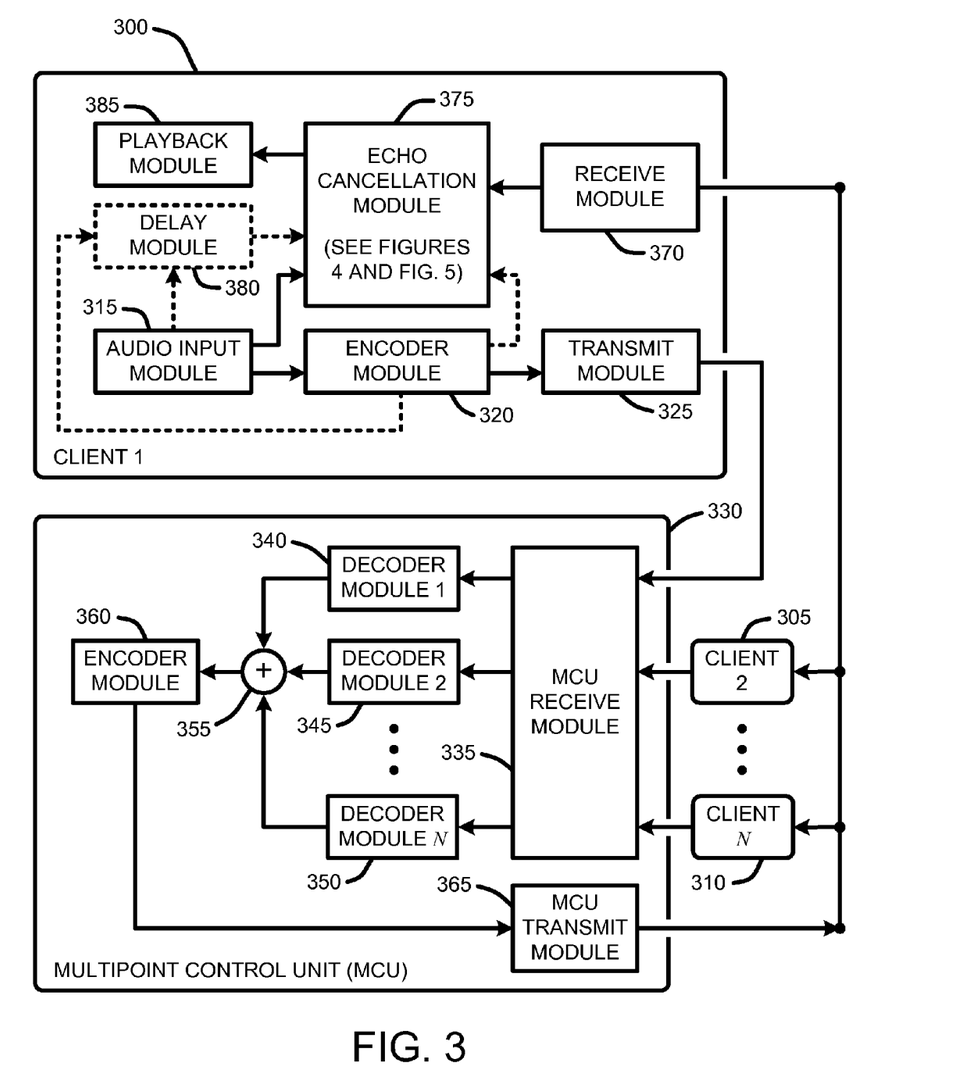
FIG. 3 provides an exemplary architectural flow diagram that illustrates program modules for implementing the Client-Side Echo Canceller, as described herein.
Figure 4:
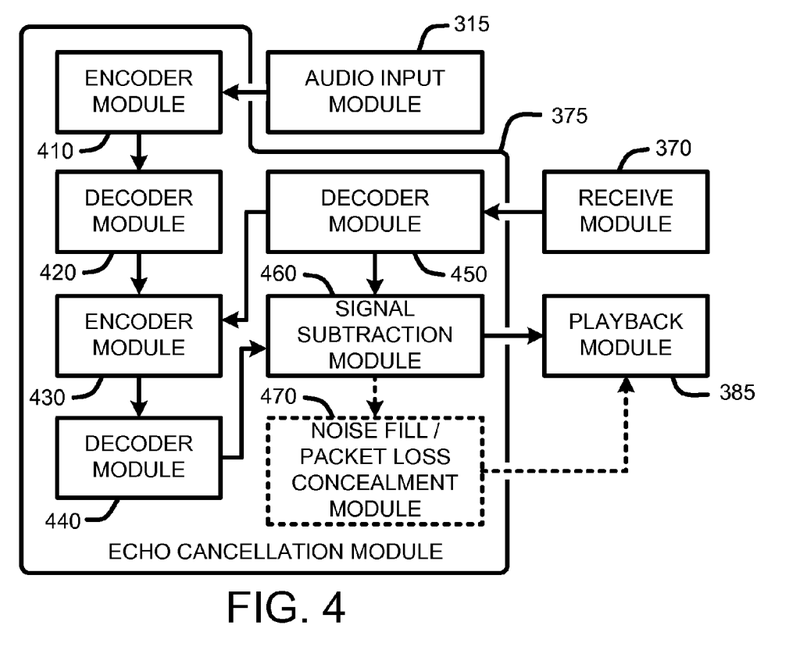
FIG. 4 provides an exemplary architectural flow diagram that illustrates program modules for implementing various embodiments of an echo cancellation module illustrated in FIG. 3, as described herein.
Figure 5:
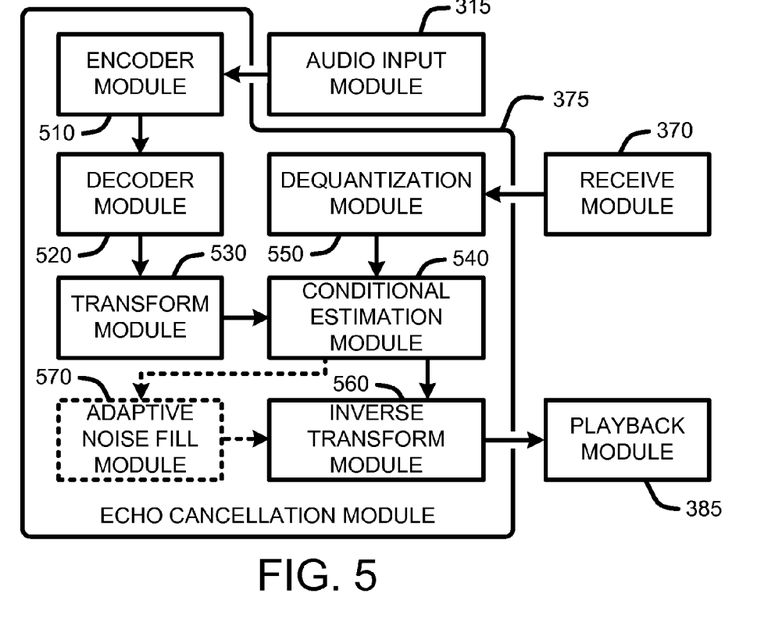
FIG. 5 provides an exemplary architectural flow diagram that illustrates program modules for implementing various embodiments of an echo cancellation module illustrated in FIG. 3, as described herein.

2.2 System Architectural Overview:

The processes summarized above are illustrated by the general system diagram of FIG. 3. In particular, the system diagram of FIG. 3 illustrates the interrelationships between program modules for implementing the Client-Side Echo Canceller, as described herein. Further, FIG. 4 and FIG. 5 illustrate various embodiments for implementing particular program modules illustrated in FIG. 3. It should be noted that any boxes and interconnections between boxes that are represented by broken or dashed lines in any of FIG. 3, FIG. 4 and FIG. 5 represent alternate embodiments of the Client-Side Echo Canceller described herein, and that any or all of these alternate embodiments, as described below, may be used in combination with other alternate embodiments that are described throughout this document. It should also be noted that FIG. 3, FIG. 4, and FIG. 5 each illustrate multiple encoders and decoders for purposes of explanation. However, it should be clear that a single encoder or a single decoder can perform the functionality of multiple encoders or decoders by processing signals in series rather than parallel.

In general, as illustrated by FIG. 3, the Client-Side Echo Canceller is represented by a plurality of client devices (300, 305, and 310) interconnected in a multipoint audio conference via a Multipoint Control Unit (MCU) 330. Note that each client (300, 305, and 310) should be understood to include the same functionality as that illustrated and described with respect to client 300. However, for purposes of explanation, clients 305 and 310 are illustrated in FIG. 3 as "black boxes" having only a single input and a single output. Therefore, the operation of client 300, as described below, should be understood to apply to each of the N clients connected in the multipoint audio conference via the MCU 330.

In particular, each client (300, 305, 310) includes an audio input module 315 for capturing a local audio input signal (such as, for example, one or more local individuals speaking into a microphone or a microphone array). This local audio input signal is then provided in real-time to an encoder module 320. The encoder module 320 then acts to encode the audio input signal for transmission across a network, such as the Internet or other network. A transmit module 325 then uses conventional techniques for transmitting the encoded signal to the MCU 330 in real-time. This process is simultaneously performed by all clients (300, 305, and 310) so that the MCU is receiving real-time encoded signals from all clients connected in the multipoint audio conference.

The MCU 330 includes an MCU receive module 335 for receiving the encoded signals transmitted from all clients (300, 305, 310). The received encoded signals are then passed by the MCU receive module 335 to one or more decoder modules (340, 345, 350) operating in parallel to reconstruct the audio input signal of each individual client (300, 305, 310). These individual audio input signals are then combined 355 using conventional signal composition techniques to construct a single composite signal that is then provided to an encoder module 360. The encoder module 360 then encodes the composite signal for real-time transmission across the network, back to each of the individual clients (300, 305, and 310).

Each of the decoder modules may perform packet loss concealment to conceal any packet losses in the transmission from one or more clients (300, 305, and 310). In addition, in one embodiment, the encoder module 360 of the MCU uses conventional packet loss concealment techniques to address packets lost in transmission from one or more clients (300, 305, and 310). In this case, a side stream is included in the composite signal to let each client (300, 305, and 310) know what packets have been lost, and from which clients they have been lost, so that those clients can perform the same loss concealment on corresponding packets of their local audio input signal. This process ensures continuity between the local audio input signal and the composite signal provided by the MCU. Note that packet loss concealment techniques are well known to those skilled in the art, and will not be described in detail herein.

Regardless of whether packet loss concealment has been applied by the MCU 330, each client (300, 305, 310) uses a receive module 370 to receive the composite signal transmitted from the MCU. The composite signal is then provided to an echo cancellation module 375. The echo cancellation module also receives a local copy of the audio input signal from the audio input module 315. Note that time synching of the local audio input signal to the composite signal is a simple matter since any time stamp included in the local audio signal can be propagated through the MCU 330 and back to each client (300, 305, 310). Similarly, if the round-trip transmission delay time from the client (300, 305, 310) to the MCU 330 and back is known or measured, then that delay time can be used to synchronize the local audio input signal to the composite signal by using a delay module 380 to temporarily delay or buffer the local audio input signal before it is provided to the echo cancellation module 375.

Given a copy of the composite signal and a copy of the local audio input signal, each client (300, 305, 310) then uses the echo cancellation module 375 to either remove the local audio input signal from the composite signal, or to estimate a version of the composite signal that does not include a contribution from the local audio input signal. In either case, the echo cancellation module 375 provides a processed version of the composite signal which represents a "clean" version of the composite signal that does not include the local audio input signal. This clean version of the composite signal is then provided to a playback module 385 for local real-time playback. Since the clean version of the composite signal does not include the local audio input signal, participants will not hear a delayed "echo" of that local audio input during the playback provided by the playback module 385.

As illustrated by FIG. 4 and FIG. 5, and as described in greater detail in Section 3, the echo cancellation module 375 of FIG. 3 may be implemented in any of several various embodiments.

For example, as noted above, non-linear quantization-based distortions are typically introduced into the composite signal by the MCU 330. This distortion, i.e., quantization noise, is random, but its energy is roughly proportional to the encoded signal, producing a residual signal that sounds like a distorted echo. Consequently, in one embodiment, as illustrated by FIG. 4, and as described in greater detail in Section 3.3, the echo cancellation module 375 generates an estimate of the quantization noise by first passing the local audio input signal of the client (300, 305, 310) through two encoding and decoding cycles to simulate the entire encoding and decoding chain from each client, to the MCU 330, and back again. This sequence of encoding and decoding is represented by the sequence of encoder module 410, decoder module 420, encoder module 430 and decoder module 440. Note also, that in one embodiment, rather than using a separate encoder 410 to provide the initial encoding step of the echo cancellation module 375, the output of encoder 320 (see FIG. 3) is simply provided to the decoder module 420, thereby eliminating the need for encoder 410.

Since quantization parameters (e.g., quantization step) are input dependent, the second local encoding step (encoder module 430) is automatically set to use the same quantization parameters used by the encoder 360 in the MCU 330 (see FIG. 3). This constraint is referred to herein as an "enforced-quantization based approach." It should be noted that these quantization parameters are obtained directly from the bitstream of the composite signal received by the client (300, 305, 310) when decoding the composite signal using decoder module 450 which passes the quantization parameters to the encoder module 430.

The resulting version of the twice encoded and twice decoded local audio input signal produced by the decoder module 440 therefore represents an estimate of the contribution of the local client composite signal, as distorted by the aforementioned quantization effects. This version of the local audio input signal produced by the decoder module 440 is then passed to a signal subtraction module 460. The signal subtraction module 460 also receives a decoder copy of the composite signal from the decoder module 450. The signal subtraction module 460 then subtracts the twice encoded and decoded version of the local audio signal from the decoded composite signal to produce a processed version of the composite signal from which the contribution of the local audio signal has been cancelled. The processed version of the composite signal produced by the signal subtraction module 460 is then provided to the playback module 385 for local playback, as described above.

In addition, in one embodiment rather than directly providing the processed version of the composite signal produced by the signal subtraction module 460 to the playback module 385 for local playback, the signal subtraction module instead provides that signal to a noise fill/packet loss module 470. In various embodiments, the noise fill/packet loss module 470 provides either or both adaptive noise fill to hide artifacts resulting from local signal cancellation, or packet loss concealment techniques to address lost or delayed packets. For example, as described in further detail in Section 3.5, the noise fill/packet loss module 470 operates on transform domain coefficients of the processed version of the composite signal produced by the signal subtraction module 460 to insert noise fill into particular frequency bins of that signal to hide artifacts. Similarly, in a related embodiment, the noise fill/packet loss module 470 of the Client-Side Echo Canceller also uses conventional packet loss concealment techniques to address lost or overly delayed packets to correct packet errors resulting either from transmission of the local client (300, 305, 310) to the MCU 330, or from the MCU to the local client.

The embodiment of the echo cancellation module 375 described above with respect to FIG. 4 operates in the time domain to produce the processed version of the composite signal for playback. However, in another embodiment of the echo cancellation module 375, as illustrated by FIG. 5, the echo cancellation module 375 of the Client-Side Echo Canceller operates in the transform domain to directly produce an estimate of a cleaned version of the composite signal which represents a version of the composite signal without any local audio signal contribution.

In particular, as illustrated by FIG. 5, and as described in greater detail in Section 3.4, the echo cancellation module 375 directly generates an estimate of the "clean" version (i.e., no local audio signal contribution) of the composite signal. This estimate of the clean version of the composite signal is generated by first passing the local audio input signal of the client (300, 305, and 310) through one encoding and decoding cycle. This sequence of encoding and decoding is represented by the sequence of encoder module 510 and decoder module 520. As with FIG. 4, it should be noted that encoder 320 of FIG. 3 can be used to eliminate the need for encoder 510 by simply providing the output of encoder 320 to decoder 520.

The output of the decoder module 520 represents a time-domain version of the original local audio input signal having some quantization-based distortion. This distorted version of the original local audio input signal is then provided to a transform module 530 which processes overlapping frames of the distorted version of the original local audio input signal to generates blocks of transform coefficients using a conventional transform, such as, for example the well-known modulated lapped transform (MLT) to produce the MLT coefficients. Note that other transforms can be used if desired. However, for purposes of explanation, the remainder of the discussion regarding transforms will assume the use of an MLT-based codec for producing the transform coefficients.

In any case, once the transform module has produced the MLT coefficients representing the distorted version of the original local audio input signal, those coefficients are provided to a conditional estimation module 540. In addition, the conditional estimation module 540 also receives the output of a dequantization module 550. This dequantization module 550 operates (in the transform domain) on the encoded composite signal provided by the MCU 330 (see FIG. 3) to perform the inverse of the quantization applied by the encoder module 360 of the MCU 330 (see FIG. 3) when encoding the composite signal. As noted above, the quantization levels are determinable from the composite signal without the use of additional side information. Consequently, this dequantization ensures that the transform coefficients of the composite signal are scaled the same as the transform coefficients of the distorted version of the original local audio input signal output by the transform module 530.

The conditional estimation module 540 then uses the MLT coefficients representing the distorted version of the original local audio input signal in combination with the dequantized version of the composite signal to iteratively estimate a transform domain version of the "clean" version (i.e., no local audio signal contribution) of the composite signal. An inverse transform module 560 then transforms the estimated clean version of the composite signal to the time domain and provides the time domain signal to the playback module 385 for real-time playback.

In addition, in one embodiment, as noted above, the Client-Side Echo Canceller provides adaptive noise fill to hide artifacts resulting from local signal cancellation. In this case, an adaptive noise fill module 570 operates on the transform domain coefficients of the estimated clean version of the composite signal to insert noise fill into particular frequency bins of the estimated clean version of the composite signal to hide artifacts. Note that noise fill is discussed in greater detail in Section 3.5, and can be applied to the clean version of the composite signal (i.e., the version of the signal that is either computed by removing the local signal, or estimated without the local signal) in any of the above described embodiments described with respect to FIG. 3, FIG. 4 and FIG. 5. Similarly, in a related embodiment, the Client-Side Echo Canceller also uses conventional packet loss concealment techniques to address lost or overly delayed packets to correct packet errors resulting either from transmission of the local client (300, 305, 310) to the MCU 330, or from the MCU to the local client.

3.0 Operation Overview:

The above-described program modules are employed for implementing the Client-Side Echo Canceller. As summarized above, the Client-Side Echo Canceller provides client-side echo cancellation by locally cancelling each clients audio signal contribution to a common composite audio signal created from the audio signal contributions of all clients connected in a multipoint audio conference prior to local playback of the composite audio signal. The following sections provide a detailed discussion of the operation of the Client-Side Echo Canceller, and of exemplary methods for implementing the program modules described in Section 2 with respect to FIG. 3, FIG. 4, and FIG. 5.

3.1 Operational Details of the Client-Side Echo Canceller:

The following paragraphs detail specific operational and alternate embodiments of the Client-Side Echo Canceller described herein. In particular, the following paragraphs describe details of general quantization error; enforced quantization for estimating quantization error; transform-domain signal estimation for locally estimating a clean version of the composite signal; and adaptive noise fill. Following the detailed description of the aforementioned features of the Client-Side Echo Canceller, an operational flow diagram is described in Section 4, with respect to FIG. 6, which summarizes the overall operation of various embodiments of the Client-Side Echo Canceller in view of the following detailed description.

3.2 Quantization Error:

As noted above, each client has access to its own local signal, as sent to the MCU. Therefore, if transcoding at the MCU were lossless, each client could perfectly remove its own signal from the mixed speech. However, non-linear distortions are introduced by the MCU encoder, mainly due to the quantization. This distortion, i.e., quantization noise, is random, but its energy is roughly proportional to the encoded signal, producing a residual signal that sounds like a distorted echo.

Quantization error is generally considered impossible to predict. However, since each client has access to both its own local signal and to the composite signal, it is possible for each client to generate a reasonable estimate of the effects of quantization noise for use in removing or otherwise cancelling the local signal from the overall composite signal.

3.3 Enforced Quantization for Enabling Client-Side Echo Cancellation:

As noted above, in one embodiment, quantization noise is estimated or predicted to reduce the residual echo when cancelling the local audio input signal from the composite signal provided by the MCU. To that end, an enforced-quantization based process is used, as described above with respect to FIG. 4.

In general, in this enforced-quantization based approach, the original speech or audio signal will go through two encoding and decoding cycles to simulate the whole process from local signal input and encoding, to transmission to the MCU, then transmission back to the local client for local real-time processing and playback. Since quantization parameters (e.g., quantization step) are input dependent, the second local encoder is automatically forced to use the same quantization parameters used by the encoder in the MCU. It should be noted that all the required quantization parameters are obtained from the bitstream of the composite signal speech without extra cost (i.e., no additional side information is needed) since, as is well known to those skilled in the art, encoders generally include this information in the bitstream for use by the decoder.

Specifically, for any particular local client (i.e., client "A"), the local audio input signal transmitted to the MCU (and maintained for local cancellation, as described below) is referred to as "signal A," and the sum of the signals that are transmitted to the MCU from all clients other than client A is referred to as "signal B." Therefore, the composite signal constructed by the MCU represents the combination of signal A and signal B (which together simply represents the combined signals from all clients). Then, the MCU encodes the mixed signal A+B into a single common signal stream representing the composite audio signal and transmits it to all clients on an ongoing basis during the multi-point audio conference. For example, in the case of a uniform scalar quantizer, the signal transmitted to each client is $Q(A+B)=k_{A+B}Q_s$, where $Q(\cdot)$ denotes scalar quantization, $Q_s$ is the quantization step used, and $k_{A+B}$ is the appropriate quantization index for A+B. Note that this idea can easily be extended to quantizers other than a uniform scalar quantizer by those skilled in the art.

Quantization at the MCU is applied only to the overall composite signal when encoding that signal for transmission back to the clients, as described above. However, the resulting quantization-based distortion is evaluated as if the same quantization were applied to A and B separately. Consequently, as illustrated by Equation 1, signal A and signal B can be represented as follows, where:

$$A = k_A Q_s + e_A,$$

$$B = k_B Q_s + e_B,$$

$$Q(A+B) = (k_A+k_B)Q_s + Q(e_A+e_B) \quad \text{Equation 1}$$

where, $e_A$ and $e_B$ are the quantization error for A and B.

In general, in accordance with FIG. 4, the estimation of the contribution of A to the received signal is obtained by re-quantizing A using $Q_s$. Consequently, the final signal, $\hat{B}$, (i.e., the "clean" version of the composite signal that does not include the local audio input signal) played at the local client is given by: $\hat{B} = Q(A+B) - Q(A)$, which can also be written as: $k_B Q_s + Q(e_A+e_B)$. Therefore, any residual distortion after echo cancellation is $B - \hat{B} = e_B - Q(e_A+e_B)$, which can be written as illustrated by Equation 2, where:

$$|B - \hat{B}| = \begin{cases} e_B, & \text{if } Q(e_A+e_B) = 0 \\ Q_S - |e_B|, & \text{if } Q(e_A+e_B) = \pm Q_S \end{cases} \quad \text{Equation 2}$$

In other words, whenever $Q(e_A+e_B)=0$, the quantization error is the same as if the client had never transmitted A to the MCU. Otherwise, the error may be larger, but still smaller than the error resulting from quantization step of the encoder. Listening tests of a tested embodiment of the Client-Side Echo Canceller show that this enforced-quantization based process removes essentially all echo, but it does introduce some perceptible artifacts into the final output signal, $\hat{B}$.

These artifacts have two main origins, which can be easily observed in the Equation 2. First, the higher quantization step for the mixed signal may quantize too many coefficients to zero. And second, any spurious or random larger quantization errors may be noticeable by a human listener.

To address this noise, various embodiments of the Client-Side Echo Canceller apply adaptive noise-fill techniques to "hide" artifacts resulting from local signal cancellation. Noise fill is a concept that is known to those skilled in the art. As such, any desired conventional noise-fill technique can be applied to the final signal prior to playback by the local client. However, a novel noise fill process for use by the Client-Side Echo Canceller is described below in greater detail in Section 3.5.

3.4 Transform Domain Signal Estimation:

As discussed above, in another embodiment, each client of the Client-Side Echo Canceller directly estimates a version of the composite signal without that client's local contribution to the composite signal. One advantage of this embodiment is that it introduces less residual distortion into the final output signal, $\hat{B}$, than the enforced quantization based process described above in Section 3.3.

In accordance with FIG. 5, this embodiment has three main changes in relation to the process described in Section 3.3 with respect to the aforementioned enforced quantization process. First, this embodiment is performed in the MLT domain (or other frequency domain) instead of the time domain. Second, the Client-Side Echo Canceller directly computes the desired clean version of the signal, $\hat{B}$, for playback using a conditional estimation, instead of estimating (and subtracting) the echo as discussed in Section 3.3. Finally, an adaptive noise-fill (see Section 3.5) is introduced to further reduce the artifacts. However, as noted above, this last change, i.e., noise-fill, can also be applied to the enforced quantization based process described in Section 3.3.

3.4.1 Conditional Estimation:

In general, the signal cancellation problem can be formulated as follows: Given A and Q(A+B), find the best estimation $\hat{B}$ of B to minimize the mean-square error $E[(B-\hat{B})^2]$. It is easy to show that the solution for the above problem is the conditional mean of B, which can be written as illustrated by Equation 3, where:

$$\hat{B} = \frac{\int_{(k-d)Q_S - A}^{(k+1-d)Q_S - A} x \cdot f(B=x) dx}{\int_{(k-d)Q_S - A}^{(k+1-d)Q_S - A} f(B=x) dx} \quad \text{Equation 3}$$

where d is the "dead zone" of the scalar quantizer of the encoder. Note that the concept of a dead zone is well known to those skilled in the art of quantization and will not be described in detail herein. In general, the dead zone represents a range in which coefficients quantize to zero, thereby creating longer runs of zeros to improve encoding efficiency.

To solve Equation 3, the probability distribution function (PDF) of B, say f(B), is needed, which is unknown. The well known ITU-T G.722.1 codec groups MLT coefficients in groups of 20, called regions. Therefore, while the Client-Side Echo Canceller can use any desired codec, when using the ITU-T G.722.1 codec, the Client-Side Echo Canceller assumes that all the 20 MLT coefficients, i.e., $B_i(i=1, \ldots, 20)$, in the same region are independent, identical Gaussian distributed with zero-mean and variance $\sigma^2$. Then f(B) only depends on $\sigma^2$, which can be estimated using any conventional technique for determining variance, such as, for example, the simple technique illustrated by Equation 4, as follows:

$$\sigma^2 = \frac{1}{20}\sum_{1}^{20} \hat{B}_i^2 \qquad \text{Equation 4}$$

Consequently, the problem can now be addressed as a need to jointly solve Equation 3 and Equation 4, where Equation 4 is an initial estimate of the variance that is refined by iteratively minimizing the error. Note that there are 20 equations included in Equation 3, one for each of the 20 MLT coefficients in that same region.

To solve this system of equations, the Client-Side Echo Canceller can use any of a number of techniques for solving systems of equations. For example, in one embodiment, the Client-Side Echo Canceller uses an iterative procedure as illustrated below in Table 1. It should be noted that the iterative procedure illustrated in Table 1 generally converges after only a few iterations. However, in the case where iteration does not occur quickly, a limit on the maximum number of iterations can be set to ensure that additional unacceptable delay is not introduced into the playback of the final clean version of the composite signal for local playback.

TABLE 1

Iterative Process for Conditional Estimation

1. Initialize $\hat{B}_i(i = 1, \ldots, 20)$ as: $\hat{B}_i = Q(A_i + B_i) - Q(A_i)$, where the same quantizer is used for $A_i$ as that for the mixed signal $A_i + B_i$. Specifically, the initialized estimation of $B_i$ is the result of the enforced quantization based process described in Section 3.3.

2. Iterate the following two steps until convergence or max number of iterations:

(a) Estimate $\sigma^2$ based on $\hat{B}_i(i = 1, \ldots, 20)$:

$$\sigma^2 = \frac{1}{20}\sum_{1}^{20} \hat{B}_i^2$$

(b) Estimate $\hat{B}_i(i = 1, \ldots, 20)$ based on $\sigma^2$:

$$\hat{B}_i = \begin{cases} 0, & \text{if } Q(A_i + B_i) - Q(A_i) = 0 \\ \dfrac{\int_{(k_i-d_i)Q_s-A_i}^{(k_i+1-d_i)Q_s-A_i} x \cdot f(B_i = x)dx}{\int_{(k_i-d_i)Q_s-A_i}^{(k_i+1-d_i)Q_s-A_i} f(B_i = x)dx}, & \text{otherwise} \end{cases}$$

where, it should be noted that the estimation of $\hat{B}_i$ is set as 0 when B is so small that $Q(A_i + B_i) - Q(A_i) = 0$ to avoid residual echo.

3.5 Adaptive Noise Fill:

As noted above, any desired conventional codec can be used for implementing the encoders and decoders of the Client-Side Echo Canceller. One example of a common codec for use in voice communications is the well known ITU-T G.722.1 codec. Noise-fill is used in the original ITU-T G.722.1 codec. As is known to those skilled in the art, noise fill is used for masking artifacts in a signal.

In accordance with the original ITU-T G.722.1 codec, noise is inserted for all coefficients in the signal regions assigned category 7 (since no MLT coefficient amplitudes are encoded for these regions) and for the coefficients coded as zero in the regions assigned category 5 or 6 (since the large quantization step sizes in these categories result in most MLT coefficients being coded as zero). The amplitude of the inserted noise is proportional to the quantization step size, which is related to the region power.

However, the original noise-fill scheme in the ITU-T G.722.1 doesn't directly apply to the noise fill enabled by the Client-Side Echo Canceller, since, unlike the ITU-T G.722.1 codec, the Client-Side Echo Canceller applies noise-fill techniques for the desired speech signal after echo cancellation, but uses a quantization parameter that is determined by the mixed speech signal (i.e., the composite audio signal constructed by the MCU).

Consequently, the Client-Side Echo Canceller provides a novel adaptation of conventional noise-fill techniques to address the following two issues: 1) where to fill noise; and 2) how much noise to fill. In general, if a large portion of the signal is removed then more noise fill is added to mask artifacts. Conversely, if a small portion of the signal is removed, then less noise is needed to mask artifacts. These issues are addressed by the three step noise fill procedure discussed in the following paragraphs, where the basic idea is to identify regions with large numbers of zeros to get noise filled, thereby masking artifacts by adding noise.

1) First, If the desired speech (or audio signal) is dominant, compared with the echo speech (or audio signal) in this region, (i.e., $E_d \gg E_e$, where $E_d$ and $E_e$ are the quantized energy of the desired speech and the echo speech, respectively), the same strategy with the original G.722.1 codec is used, i.e., noise is filled for any zero coefficient in regions assigned category 5, 6 or 7.

2) If the desired speech (or audio signal) and the echo speech (or audio signal) are comparable in this region, and the region is assigned category 3, 4, 5, 6 or 7, then noise fill is used for the coefficients coded as zero in this region.

3) If the echo speech (or audio signal) is dominant in this region, i.e. $E_d \ll E_e$, then noise is filled for the coefficients coded as zero in this region regardless of the category assigned.

In each of the three cases enumerated above, the amplitude of the filled noise is determined as illustrated by Equation 5, where:

$$N_f = \min\{f_1(Q_s), f_2(E_q)\} \qquad \text{Equation 5}$$

where, $Q_s$ is the quantization step, $f_1(Q_s)$ is a linear function of $Q_s$, which is same as that of the original G.722.1 codec, and $f_2(E_q)$ is a linear function of the quantized region power $E_q$ of the desired speech B.

In particular, $E_q$ is computed based on each of the 20 regions of MLT coefficients as illustrated by Equation 6, where:

$$E_q = \sqrt{\sum_{i=1}^{20} \hat{B}_i^2 / 20} \qquad \text{Equation 6}$$

Further, if $E_q = 0$, then it is estimated based on its time-domain and frequency-domain neighbors, as illustrated by Equation 7, where:

$$E_q \Leftarrow f(E_q^p, E_q^l, E_q^h, E_q) \qquad \text{Equation 7}$$

where, $f(\cdot)$ is a log-linear interpolation function, $E_q$ represents the estimate for a particular region of coefficients of the current frame of the signal, $E_q^p$ represents the corresponding region of coefficients in the immediately preceding signal frame, $E_q^l$ represents the immediately adjacent lower frequency region of coefficients of the current signal frame, and $E_q^h$ represents the immediately adjacent higher frequency region of coefficients of the current signal frame. Further, if several consecutive regions need to be estimated, then the region with most known neighbors will be estimated first.

Figure 6:
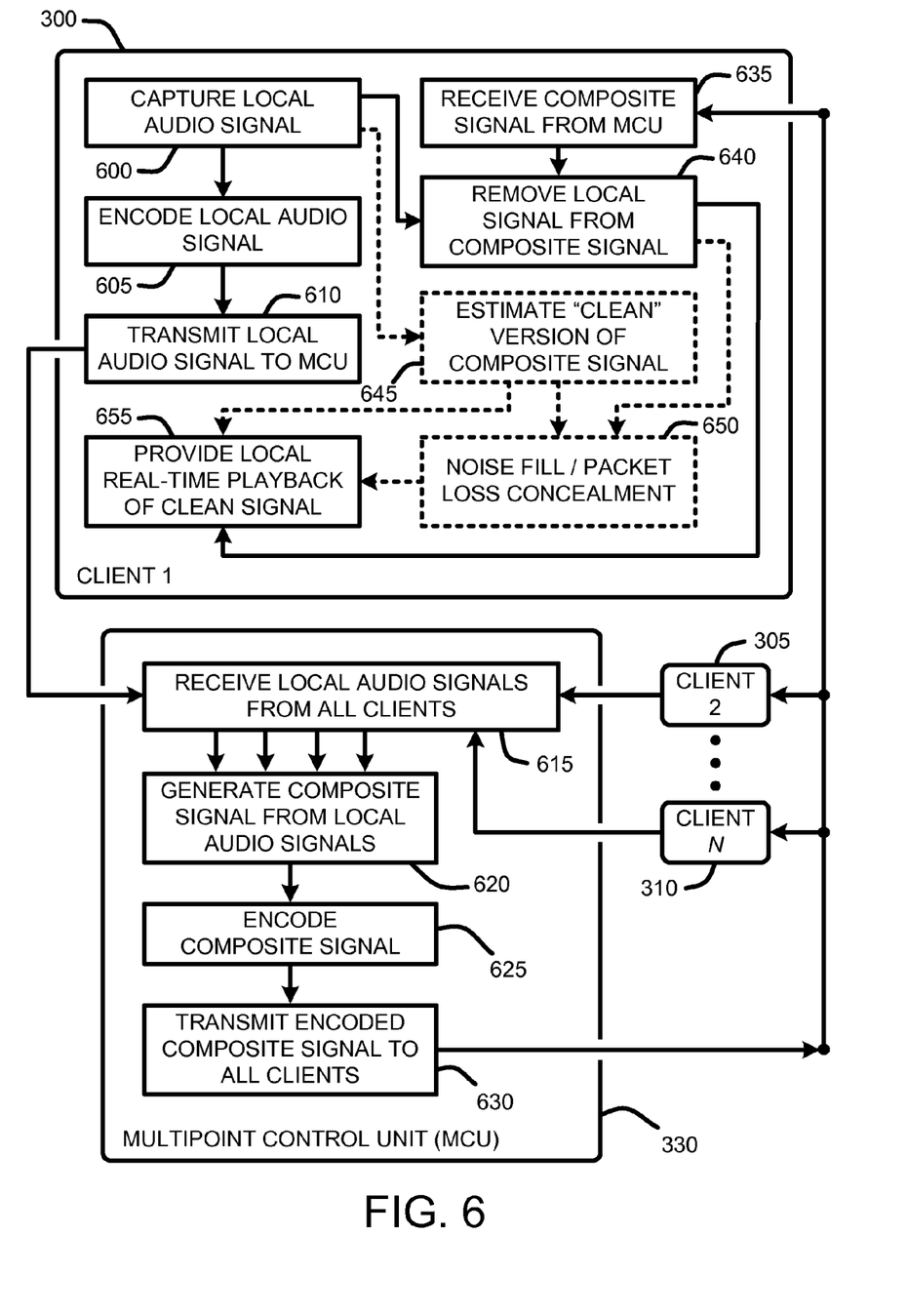
FIG. 6 provides an exemplary operational flow diagram illustrating general operation of various embodiments of the Client-Side Echo Canceller, as described herein.

4.0 Client-Side Echo Canceller Operational Embodiments:

The processes described above with respect to FIG. 1 through FIG. 5 are illustrated by the general operational flow diagram of FIG. 6. In general, FIG. 6 illustrates an exemplary operational flow diagram showing various operational embodiments of the Client-Side Echo Canceller. It should be noted that any boxes and interconnections between boxes that are represented by broken or dashed lines in FIG. 6 represent alternate embodiments of the Client-Side Echo Canceller described herein, and that any or all of these alternate embodiments, as described below, may be used in combination with other alternate embodiments that are described throughout this document.

In particular, as illustrated by FIG. 6, the Client-Side Echo Canceller begins operation by connecting two or more clients (300, 305, and 310) to the MCU 330 to begin a multi-point audio conferencing session. Once connected, each client (300, 305, and 310) begins capturing 600 their local audio signal. This local audio signal is then encoded 605 and transmitted 610 to the MCU 330. Note that signal capture 600 and transmission 610 continues in real-time throughout the multi-point audio conferencing session.

The MCU 330 receives 615 the real-time transmissions of local audio signals from each of the clients (300, 305, 310), and uses those signals to generate a single composite signal. The composite signal is then encoded 625 and transmitted 630 back to each of the individual clients (300, 305, and 310) by the MCU 330. Again, this encoding 625 and transmission 630 continues in real-time throughout the multi-point audio conferencing session.

Each client (300, 305, 310) then receives 635 the composite signal transmitted 630 from the MCU 330. In one embodiment, each client (300, 305, 310) then uses an enforced quantization based process to remove 640 the client's own contribution of the local audio from the composite signal to construct a "clean" version of the composite signal. In a related embodiment, rather than remove the local audio signal from the composite signal, each client (300, 305, 310) instead uses the local audio signal in combination with the composite signal to directly estimate 645 a "clean" version of the composite signal.

In either case, given the "clean" version of the composite signal, each client (300, 305, and 310) then provides a local real-time playback 655 of that signal. However, in another embodiment, prior to playback 655, each client (300, 305, and 310) optionally improves the perceptual quality of the "clean" version of the composite signal using noise fill and/or packet loss concealment techniques 650, as described above.

The foregoing description of the Client-Side Echo Canceller has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the Client-Side Echo Canceller. It is intended that the scope of the invention be limited not by this detailed description, but rather by the claims appended hereto.

What is claimed is:

1. A process for eliminating a contribution of a local audio signal from a composite audio signal, comprising process actions for:

for each of two or more separately located local client computing devices ("client"), capturing a real-time local audio signal;

for each client, transmitting each real-time local audio signal to a remote computing device;

using the remote computing device to generate a real-time composite audio signal comprising a combination of all of the real-time local audio signals;

transmitting the composite audio signal from the remote computing device to each client;

for each client, constructing a local version of the composite audio signal based on estimates of quantization noise introduced into the composite audio signal by the remote computing device;

wherein the local version of the composite audio signal of each client represents a version of the composite audio signal from which each client's real-time local audio signal has been eliminated; and for each client, providing a real-time playback of the local version of the composite audio signal.

2. The process of claim 1 wherein constructing the local version of the composite audio signal comprises, for each client:

applying a first encoding and decoding cycle to the real-time local audio signal to produce an intermediate local audio signal;

applying a second encoding and decoding cycle to the intermediate local audio signal to produce an estimate of the local audio signal;

wherein the encoding of the second encoding and decoding cycle uses a same quantization level as a first quantization level used by the remote computing device to encode the composite audio signal prior to transmitting the composite audio signal from the remote computing device to each client; and subtracting the estimate of the local audio signal from the composite signal to produce the local version of the composite audio signal.

3. The process of claim 1 wherein constructing the local version of the composite audio signal comprises, for each client:

applying a first encoding and decoding cycle to the real-time local audio signal to produce an intermediate local audio signal;

using a transform-based codec to transform the intermediate local audio signal from the time domain to produce a plurality of groups of transform coefficients;

dequantizing the composite audio signal transmitted by the remote computing device;

iteratively estimating a transform domain version of the local version of the composite audio signal as a joint function of the groups of transform coefficients and the dequantized composite audio signal; and applying an inverse transform to transform domain version of the local version of the composite audio signal to produce the local version of the composite audio signal.

4. The process of claim 1 further comprising, for each client, processing the local version of the composite audio signal prior to the real-time playback to noise-fill one or more regions of the local version of the composite audio signal.

5. The process of claim 1 further comprising, for each client, processing the local version of the composite audio signal prior to the real-time playback to provide packet loss concealment to hide any of late or delayed packets occurring during any of the transmission of the real-time local audio signal to the remote computing device and the transmission of the composite audio signal from the remote computing device to each client.

6. The process of claim 1 wherein one or more of the clients comprises a phone having audio capture and audio playback capabilities.

7. The process of claim 1 wherein the remote computing device comprises a Multipoint Control Unit (MCU).

8. A non-transitory computer-readable medium having computer executable instructions stored thereon for cancelling local audio signals from a composite audio signal, said computer executable instructions comprising:
receiving, on each of a plurality of local signal processing devices, a real-time composite audio signal, said real-time composite audio signal being transmitted from a remote signal processing device;
wherein the composite audio signal is constructed by the remote signal processing device, and wherein the composite audio signal comprises a combination of local audio signals received from all of the plurality of local signal processing devices;
for each local signal processing device, constructing a local version of the composite audio signal based on estimates of quantization noise introduced into the composite audio signal by the remote signal processing device; and
wherein the local version of the composite audio signal of each local signal processing device represents a version of the composite audio signal from which each local signal processing device's real-time local audio signal has been eliminated.

9. The computer-readable medium of claim 8 further comprising, for each local signal processing device, providing a real-time playback of the local version of the composite audio signal.

10. The computer-readable medium of claim 8 wherein constructing the local version of the composite audio signal comprises, for each local signal processing device:
applying two sequential encoding and decoding cycles to the real-time local audio signal to produce an estimate of the local audio signal;
wherein the encoding of the second encoding and decoding cycle uses a same set of quantization parameters as a first set of quantization parameters used by the remote signal processing device to encode the composite audio signal prior to the transmitting of the composite audio signal; and
subtracting the estimate of the local audio signal from the composite signal to produce the local version of the composite audio signal.

11. The computer-readable medium of claim 8 wherein constructing the local version of the composite audio signal comprises, for each local signal processing device:
applying a first encoding and decoding cycle to the real-time local audio signal to produce an intermediate local audio signal;
using a transform-based codec to transform the intermediate local audio signal from the time domain to produce a plurality of groups of transform coefficients;
dequantizing the composite audio signal transmitted by the remote computing device;
iteratively estimating a transform domain version of the local version of the composite audio signal as a joint function of the groups of transform coefficients and the dequantized composite audio signal; and
applying an inverse transform to transform domain version of the local version of the composite audio signal to produce the local version of the composite audio signal.

12. The computer-readable medium of claim 8 further comprising instructions for, for each local signal processing device, applying noise-fill to one or more regions of the local version of the composite audio signal prior to the real-time playback.

13. The computer-readable medium of claim 8 further comprising instructions for, for each local signal processing device, applying packet loss concealment to hide any of late or delayed packets prior to the real-time playback.

14. The computer-readable medium of claim 8 wherein one or more of the local signal processing devices is a phone that includes an audio capture device and an audio playback device.

15. A multi-point audio conferencing system, comprising:
two or more local communication devices coupled to a remote Multipoint Control Unit (MCU);
wherein each local communication device captures a local real-time audio signal and transmits it in real-time to the MCU;
wherein the MCU constructs a composite audio signal from all of the local audio signals received from the local communication devices and transmits the composite audio signal back to each local communication device in real-time;
wherein each local communication device constructs a local version of the composite audio signal based on estimates of quantization noise introduced into the composite audio signal by the MCU; and
wherein each local communication device provides a real-time playback of the local version of the composite audio signal.

16. The multi-point audio conferencing system of claim 15 wherein the local version of the composite audio signal of each local communication device represents a version of the composite audio signal from which each local communication device's real-time local audio signal has been eliminated.

17. The multi-point audio conferencing system of claim 15 wherein constructing a local version of the composite audio comprises:
applying two sequential encoding and decoding cycles to the local audio signal to produce an estimate of the local audio signal; and
subtracting the estimate of the local audio signal from the composite signal to produce the local version of the composite audio signal.

18. The multi-point audio conferencing system of claim 17 wherein the encoding of the second encoding and decoding cycle uses a same set of quantization parameters as a first set of quantization parameters used by the MCU to encode the composite audio signal prior to the transmitting of the composite audio signal.

19. The multi-point audio conferencing system of claim 15 wherein constructing a local version of the composite audio comprises:
applying a first encoding and decoding cycle to the local audio signal to produce an intermediate local audio signal;
using a transform-based codec to produce a plurality of groups of transform coefficients from the intermediate local audio signal;
dequantizing the composite audio signal transmitted by the remote computing device;
iteratively estimating a transform domain version of the local version of the composite audio signal as a joint function of the groups of transform coefficients and the dequantized composite audio signal; and applying an inverse transform to transform domain version of the local version of the composite audio signal to produce the local version of the composite audio signal.

20. The multi-point audio conferencing system of claim 15 wherein one or more of the local communications devices applies noise-fill to one or more regions of the local version of the composite audio signal prior to the real-time playback.

* * * * *